United States Patent
Cai et al.

(10) Patent No.: US 8,636,889 B2
(45) Date of Patent: Jan. 28, 2014

(54) SOLID ELECTROLYTE PRODUCING ASSEMBLY AND METHOD

(75) Inventors: Wei Cai, Shanghai (CN); Rihua Xiong, Shanghai (CN); Chang Wei, Niskayuna, NY (US); Robert Lee Solomon, Seattle, WA (US); Rengarajan Ramesh, Princeton Junction, NJ (US)

(73) Assignee: General Electric Company, Niskayuna, NY (US)

( * ) Notice: Subject to any disclaimer, the term of this patent is extended or adjusted under 35 U.S.C. 154(b) by 652 days.

(21) Appl. No.: 12/544,617

(22) Filed: Aug. 20, 2009

(65) Prior Publication Data
US 2011/0042232 A1 Feb. 24, 2011

(51) Int. Cl.
*B01D 35/06* (2006.01)
*B01D 57/02* (2006.01)
*B04B 5/10* (2006.01)

(52) U.S. Cl.
USPC ........ 204/666; 204/275.1; 204/555; 204/661; 204/674; 210/748.01

(58) Field of Classification Search
USPC .............. 204/554, 555, 661, 666, 674, 275.1; 205/742, 747, 758; 210/748.01
See application file for complete search history.

(56) References Cited

U.S. PATENT DOCUMENTS

| | | |
|---|---|---|
| 5,779,891 A | 7/1998 | Andelman |
| 7,459,088 B2 | 12/2008 | Davis |
| 2008/0160357 A1 | 7/2008 | Pashley et al. |
| 2008/0185346 A1 | 8/2008 | Xiong et al. |

FOREIGN PATENT DOCUMENTS

| | | |
|---|---|---|
| CN | 101056693 A | 10/2007 |
| WO | 2006031732 A2 | 3/2006 |
| WO | WO2008094367 A1 | 8/2008 |

OTHER PUBLICATIONS

The Bodner Group. "Common Ions and Complex Ions." Jun. 24, 2008 capture of <http://chemed.chem.purdue.edu/genchem/topicreview/bp/ch18/complex.php> using Wayback Machine Internet Archive at <http://web.archive.org>.*
M. Louhi-Kulta. "Application in precipitation processes." Pharma Focus Asia. 2008 (no month). Issue 8. pp. 84, 86 and 87.*
PCT International Search Report dated Nov. 22, 2010 and Written Opinion.

* cited by examiner

*Primary Examiner* — Keith Hendricks
*Assistant Examiner* — Steven A. Friday
(74) *Attorney, Agent, or Firm* — Mary Louise Stanford

(57) ABSTRACT

A solid electrolyte producing system includes a supercapacitor desalination device comprising a power supply and a supercapacitor desalination unit. The supercapacitor desalination unit includes a pair of electrodes electrically coupled to the power supply and operable in a charging mode of operation and a discharging mode of operation. A feeding source is configured to provide a feed liquid to the supercapacitor desalination unit when the supercapacitor desalination unit is in the charging mode of operation. The feed liquid comprises at least one determined electrolyte. A crystallization device is providing for receiving a concentrated liquid from the supercapacitor desalination device in the discharging mode of operation, the concentrated liquid being a saturated liquid or supersaturated liquid of the at least one determined type of electrolyte. The at least one determined type of electrolyte precipitates in the crystallization device as solid electrolyte. The system further comprises a separation device for separating the solid electrolyte from the liquid of the crystallization device as a solid electrolyte product.

14 Claims, 5 Drawing Sheets

SOLID ELECTROLYTE PRODUCING ASSEMBLY AND METHOD

BACKGROUND

1. Technical Field

Embodiments of the invention relate to the field of solid electrolyte production, and more particularly to an assembly and a method of producing solid electrolyte from saline water.

2. Discussion of Related Art

Saline waters, such as seawater, salt lake water, brackish water, or an industrial saline water product are used to produce solid electrolyte. One conventional method of producing solid electrolyte comprises a thermal process such as an evaporation process to remove water from the saline water to obtain solid electrolyte. As the amount of water in the saline water is usually very large, which is, for example, about 96.5% by weight in seawater, and the process needs to change phase of water from liquid into vapor, energy consumed in the evaporation process is huge.

It may be desirable to have a device or system for producing solid electrolyte from saline water that differs from those devices or systems that are currently available. It may be desirable to have a method producing solid electrolyte from saline water that differs from those methods that are currently available.

BRIEF DESCRIPTION

In accordance with one embodiment, a solid electrolyte producing system is provided. The system includes a supercapacitor desalination device comprising a power supply and a supercapacitor desalination unit. The supercapacitor desalination unit includes a pair of electrodes electrically coupled to the power supply and operable in a charging mode of operation and a discharging mode of operation. A feeding source is configured to provide a feed liquid to the supercapacitor desalination unit when the supercapacitor desalination unit is in the charging mode of operation. The feed liquid comprises at least one determined electrolyte. A crystallization device is providing for receiving a concentrated liquid from the supercapacitor desalination device in the discharging mode of operation, the concentrated liquid being a saturated liquid or supersaturated liquid of the at least one determined type of electrolyte. The at least one determined type of electrolyte precipitates in the crystallization device as solid electrolyte. The system further comprises a separation device for separating the solid electrolyte from the liquid of the crystallization device as a solid electrolyte product.

In accordance with one embodiment, a method is provided for producing solid electrolyte. The method comprises adsorbing dissolved electrolyte ions from a feed liquid using a supercapacitor desalination unit during a charging step, desorbing ions from the supercapacitor desalination unit into a concentrated liquid during a discharge step, passing the concentrated liquid into a crystallization device for precipitating the dissolved electrolyte ions of the concentrated liquid as a solid electrolyte in the crystallization device, and separating the solid electrolyte from the concentrated liquid as an electrolyte product.

BRIEF DESCRIPTION OF THE DRAWING FIGURES

These and other features, aspects, and advantages of the present invention will become better understood when the following detailed description is read with reference to the accompanying drawings in which like characters represent like parts throughout the drawings, wherein.

DETAILED DESCRIPTION

Figure 1:
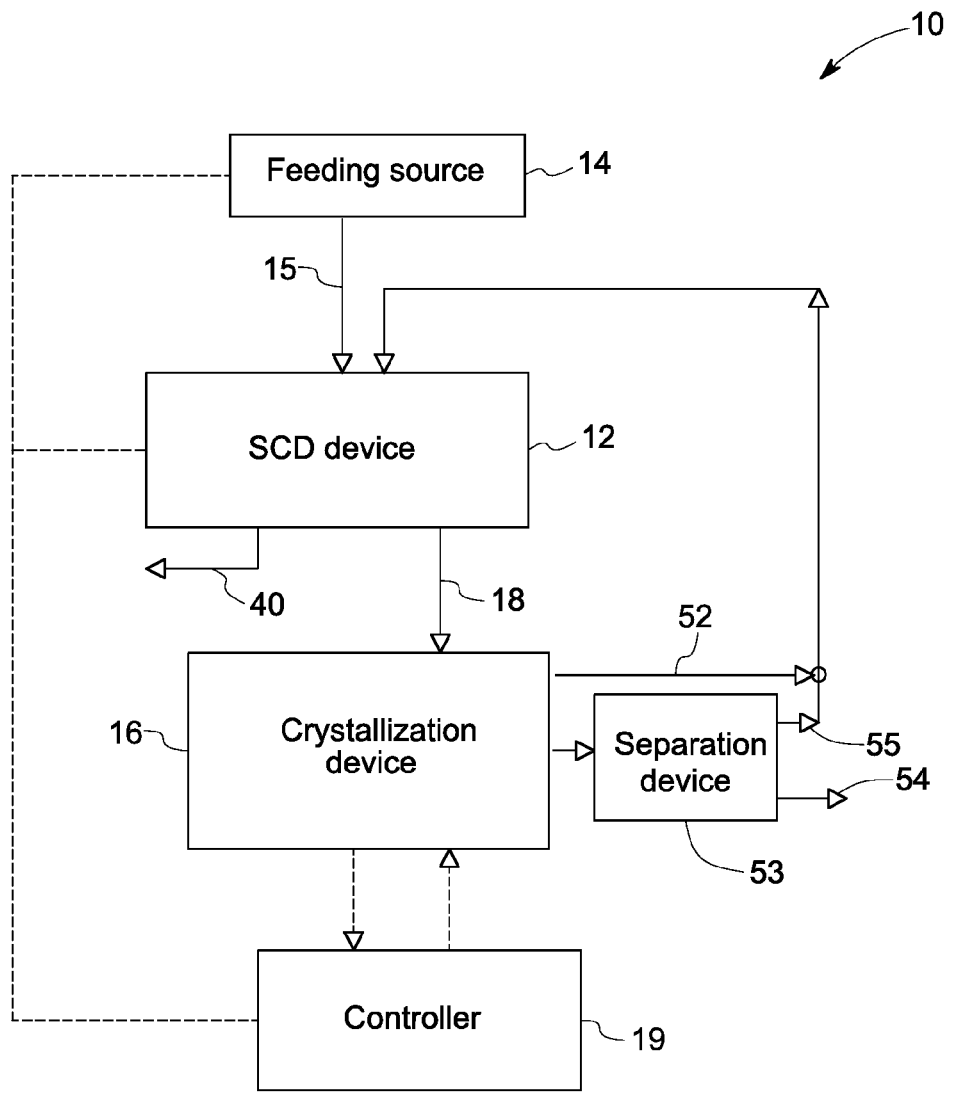
FIG. 1 is an exemplary schematic diagram of a solid electrolyte producing system according to one embodiment of the invention.

Embodiments of the invention relate to the field of solid electrolyte production. A solid electrolyte producing system according to an embodiment of the invention may be employed for producing solid electrolyte from saline water such as seawater, salt lake water, brackish water, or industrial saline water product such as the saline water product of chlor-alkali industry. Embodiments of the invention are discussed below with reference to the drawing figures. For purposes of simplicity of description, common elements across different embodiments share the same reference numbers.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items.

As used herein, "electrolyte" refers to all substances that can be diassociated in water, including salts such as NaCl, $CaSO_4$, or alkalis such as NaOH for example.

"Supercapacitor" is an electrochemical capacitor that has a relatively higher energy density when compared to a common capacitor. As used herein, "supercapacitor" is inclusive of other high performance capacitors, such as ultracapacitors. A capacitor is an electrical device that can store energy in the electric field between a pair of closely spaced conductors (called 'electrodes'). When voltage is applied to the capacitor, electric charges of equal magnitude, but opposite polarity, build up on each electrode.

As used herein, "concentration" refers to the amount of an electrolyte that is dissolved in a unit volume of water at a given temperature. "Solubility" refers to the amount of an electrolyte that can be dissolved in a unit volume of water at a given temperature. "Saturated water" refers to the water that is saturated with at least one determined kind of electrolyte at a given temperature. "Supersaturated water" refers to water that contains an amount of at least one kind of electrolyte that is greater than the solubility limit of that electrolyte at a given temperature. "Saturation rate" refers to a ratio of concentration of one determined kind of electrolyte to a solubility of the determined kind of electrolyte in water at a given temperature.

Referring to FIG. 1, a solid electrolyte producing system 10 comprises a supercapacitor desalination (SCD) device 12. The SCD device 12 is controlled to perform a plurality of successive operation cycles, and each operation cycle comprises a charging mode of operation (FIG. 2) and a discharging mode of operation (FIG. 3). A feeding source 14 provides a feed liquid 15, which is a saline water carrying dissolved cations ($M^+$) and anions ($X^-$) of at least one determined type of electrolyte ($M^+_m X^-_n$), to the SCD device 12 when the SCD device 12 is in the charging mode of operation. A crystallization device 16 receives a concentrate liquid 18 from the SCD device 12 at the discharging mode of operation. The concentrate liquid 18 is a saturated or supersaturated liquid of the determined kind of electrolyte ($M^+_m X^-_n$) and precipitates as solid electrolyte particles in the crystallization device 16. A controller 19 communicates with and controls appropriate valves, sensors, switches and the like to control operations of the SCD device 12 and the crystallization device 16.

In the illustrated embodiment of FIG. 1, the concentrated liquid 18 from the SCD device 12 in the discharging mode of operation is received by the crystallization device 16. In one embodiment, the concentrated liquid 18 in the crystallization device 16 is further fed back to the SCD device 12 through route 52, and continuously circulated and reused for the discharging operations. Accordingly, the concentration of cations and anions 36, 38 (FIGS. 2 and 3) in the concentrated liquid 18 continuously increases as the discharge continues, and the concentrated liquid 18 becomes a saturated or supersaturated water of the determined type of electrolyte ($M^+_m X^-_n$). As a result, the saturation rate will increase to a point where precipitation of electrolyte ($M^+_m X^-_n$) begins to take place in the crystallization device 16. When the precipitation rate in the crystallization device 16 equals to the ion removal rate at the charging operation, the saturation rate of ions ($M^+_m X^-_n$) in the concentrated liquid 18 will not increase any more and equilibrium will be established.

In the illustrated embodiment, the solid electrolyte producing system 10 further comprises a separation device 53 for removing solid electrolyte ($M^+_m X^-_n$) precipitated in the crystallization device 18 as an electrolyte product 54. In one embodiment, the electrolyte product 54 comprises solid electrolyte particles each having a diameter ranging from 0.001 millimeters to 1.0 millimeters. In another embodiment, the electrolyte product 54 comprises a slurry which contains the electrolyte particles. Embodiments of the separation device 53 may comprise a settling tank, a filter press, a microfilter, an ultrafilter, a hydrocyclone, or a centrifuge. In one embodiment, the electrolyte product 54 is removed from the crystallization device at charging mode of operation of the SCD device 12.

In one embodiment, the separation device 53 is a filter. Liquid after removal of solid electrolytes in the separation device 53 are continuously fed back to the SCD device 12 during discharging mode of operation through route 55.

Figure 2:
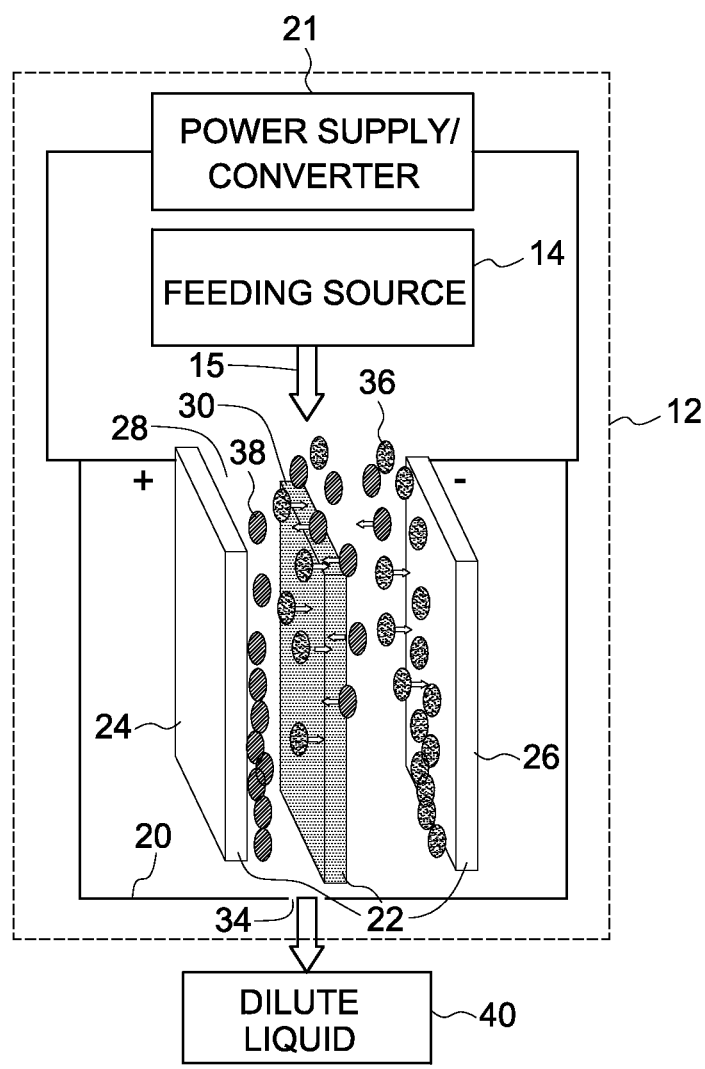
FIGS. 2 and 3 illustrate an exemplary supercapacitor desalination (SCD) device of the solid electrolyte producing system, respectively during a charging mode of operation and a discharging mode of operation, according to one embodiment of the invention.
Figure 3:
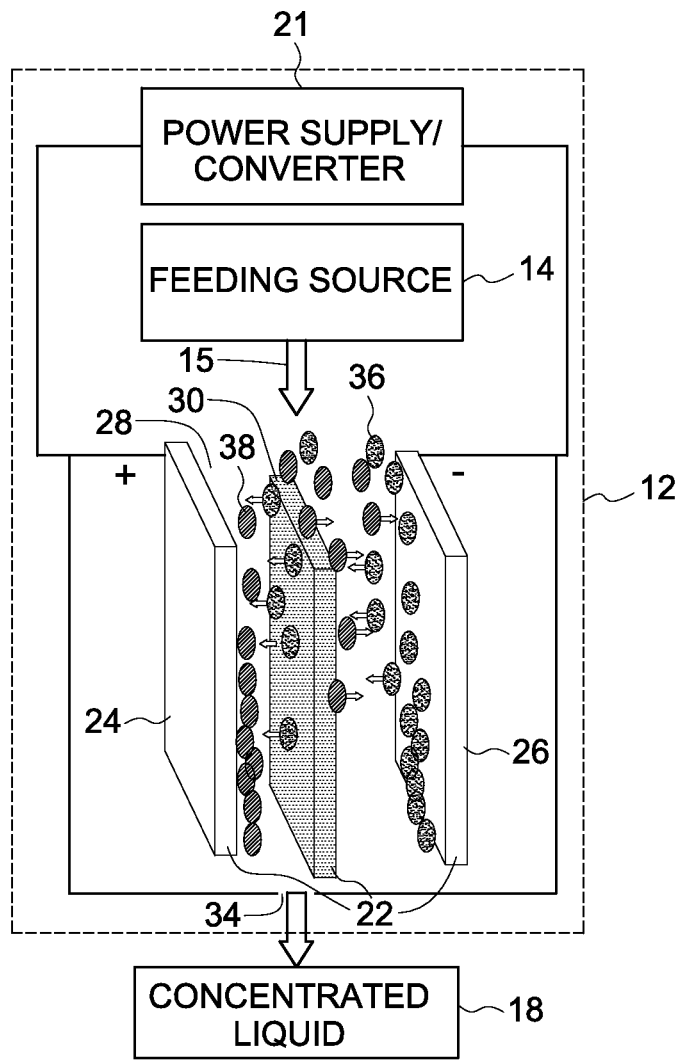

FIGS. 2 and 3 illustrates an exemplary SCD device 12 respectively at the charging mode of operation and the discharging mode of operation. In the illustrated embodiment, the exemplary SCD device 12 comprises a desalination vessel 20 defining a volume, a power supply 21, and at least one SCD unit 22 housed in the volume and electrically coupled to the power supply 21. The power supply 21 may be a voltage source, a current source, or an energy recovery converter, for example.

In the illustrated embodiment of FIGS. 2 and 3, the SCD unit 22 comprises a pair of electrodes 24, 26, and a compartment 28 defined between the pair of electrodes 24, 26. In one embodiment, the SCD unit 22 further comprises a flow spacer 30 between the pair of electrodes 24, 26. Further, the desalination vessel 20 includes at least one inlet (not labeled) from which the feed liquid 15 from the feeding source 14 enters the compartment 28, and at least one outlet 34 for exiting of an output liquid from the compartment 28. The liquid may be guided inside the desalination vessel 20 by using external forces. Suitable external forces may include gravity, suction, and pumping.

In certain embodiments, each of the first and second electrodes 24, 26 includes a porous conductive portion exposed in the compartment 28, and a current collector (not shown) within the porous conductive portion for electrically coupling to the power supply 21. The current collector may be formed of any suitable metallic structure, such as, for example, a plate, a mesh, a foil, or a sheet. In certain embodiments, the current collector may include metals such as titanium, platinum, iridium, or rhodium. In another embodiment, the current collector comprises metal alloys such as stainless steel. In still another embodiment, the current collector comprises graphite or plastic material. Suitable plastic materials may include, for example, polyolefins. Suitable polyolefins may include polyethylene, which may be mixed with conductive carbon black or metallic particles.

In certain embodiments, the porous conductive portion comprises conductive materials or composites with a high surface area. Examples of such conductive materials include carbon, carbon nanotubes, graphite, carbon fiber, carbon cloth, carbon aerogel, metallic powders such as nickel, metal oxides such as ruthenium oxide, conductive polymers, and any mixtures of any of the above.

In one embodiment, the porous conductive portion of each electrode has a plurality of pores. Accordingly, each of the first and second electrodes 24, 26 has a high surface area. In one embodiment, each electrode has a Brunauer-Emmet-Teller (BET) surface area in a range of from about 2.0 to about $5.5 \times 10^6$ ft$^2$ lb$^{-1}$ or about 400 to 1100 square meters per gram (m$^2$g$^{-1}$). In one embodiment, the electrode surface area may be in a range of up to about $1.3 \times 10^7$ ft$^2$ lb$^{-1}$ or about 2600 m$^2$g$^{-1}$. In one embodiment, each of the first and second electrodes 24, 26 has a relatively low electrical resistivity, which is, for example, less than 40 Ohm·cm$^2$. In one embodiment, an additional material may be deposited on the surfaces of the first and second electrodes 24, 26 where such an additional material may include catalysts, anti-foulants, surface energy modifiers, and the like. In one embodiment, current collectors and/or porous conductive portions of the first and second electrodes 24, 26 may or may not be the same.

Due to the large surface areas of the first and second electrodes 24, 26, the SCD unit 22 has a high adsorption capacity, high energy density, and high capacitance. In certain embodiments, the capacitance of the conductive material is greater than about 10 Farads per gram. In certain embodiments, the material capacitance may be in a range of from about 10 Farads per gram to about 50 Farads per gram, from about 50 Farads per gram to about 75 Farads per gram, from about 75 Farads per gram to about 100 Farads per gram, from about 100 Farads per gram to about 150 Farads per gram, from about 150 Farads per gram to about 250 Farads per gram, from about 250 Farads per gram to about 400 Farads per gram, from about 400 Farads per gram to about 500 Farads per gram, from about 500 Farads per gram to about 750

Farads per gram, from about 750 Farads per gram to about 800 Farads per gram, or greater than about 800 Farads per gram.

Although in the illustrated embodiment, the first and second electrodes 24, 26 are shaped as plates that are disposed parallel to each other to form a stacked structure, in other embodiments, the first and second electrodes 24, 26 may have different shapes. Such other shapes may include rugate and nested bowl configurations. In one embodiment, the first and second electrodes 24, 26 may be disposed concentrically relative to each other in a roll-type arrangement.

Suitable flow spacer 30 may include electrically insulative polymers. Suitable electrically insulative polymers may include an olefin-based material. Suitable olefin-based material can include polyethylene and polypropylene, which can be halogenated. Other suitable electrically insulative polymers can include, for example, poly vinyl chloride, polytetrafloroethylene, polysulfone, polyarylene ether, and nylon. Further, the flow spacer 30 may have a thickness in a range from about 0.0000010 centimeters to about 1 centimeter. In one embodiment, the thickness may be in a range of from about 0.0000010 centimeters to about 0.00010 centimeters, from about 0.00010 centimeters to about 0.010 centimeter, from about 0.0010 centimeters to about 0.1 centimeter, or from about 0.10 centimeters to about 1 centimeter. The flow spacer 30 may be in the form of a membrane, a mesh, a mat, a sheet, a film, or a weave. To allow fluid communication, the flow spacer 30 may be porous, perforated, or have fluid channels that extend from one major surface to another. The fluid channels, pores and perforates may have an average diameter that is less than 5 millimeters, and may be configured to increase turbulence of a through-flowing liquid. In one embodiment, the average diameter is in a range of from about 5 millimeters to about 4 millimeters, from about 4 millimeters to about 3 millimeters, from about 3 millimeters to about 2 millimeters, from about 2 millimeters to about 1 millimeter, from about 1 millimeter to about 0.5 millimeters, or less than about 0.5 millimeters. Such increased turbulence may positively affect the performance of the proximate electrode.

Referring to FIG. 2, during a charging mode of operation, the first electrode 24 is coupled to a positive terminal of the power supply 21 and acts as a positive electrode. The second electrode 26 is coupled to a negative terminal of the power supply 21 and acts as a negative electrode. The feed liquid 15 from the feeding source 14 is made to pass the SCD unit 22 and between the first and second electrodes 24, 26. Cations ($M^+$) 36 move towards and adsorbed on the conductive porous portion of the negative electrode (second electrode) 26, and anions ($X^-$) 38 move towards and adsorbed on the positive electrode (first electrode) 24. As a result of this charge accumulation inside the SCD unit 20, the output liquid, which is a dilute liquid 40 coming out of the SCD unit 20, has a lower concentration of cations ($M^+$) 36 and anions ($X^-$) 38 as compared to the feed liquid 15. In one embodiment, the dilute liquid 40 may be again subjected to electrolyte producing by being fed back to the SCD device 12. In another embodiment 40 is output for industrial use for example.

Referring to FIG. 3, during a discharging mode of operation after the charging mode of operation, the adsorbed cations and anions desorb from the surface of the first and second electrodes 24, 26. In certain embodiments, during the discharging mode of operation of the SCD unit 20, the polarities of the first and second electrodes 24, 26 may be maintained the same, but the potential difference between the first and the second electrodes 24, 26 become less, thus the anions and cations 38, 36 desorb from the first and second electrodes 24, 26. While in other embodiments, during the discharging mode of the SCD unit 20, the polarities of the first and second electrodes 24, 26 are reversed, and thus the cations 31 adsorbed on the second electrode 22 move toward the first electrode 24, and the anions 32 move from the first electrode 24 to the second electrode 26. As a result, the output liquid, which is called concentrated liquid 42, has a higher concentration of cations and anions compared to the feed liquid 15. Meanwhile, the energy released from the SCD unit 22 can be reused or recovered through an energy recovery device, for example, a bi-directional DC-DC converter.

Figure 4:
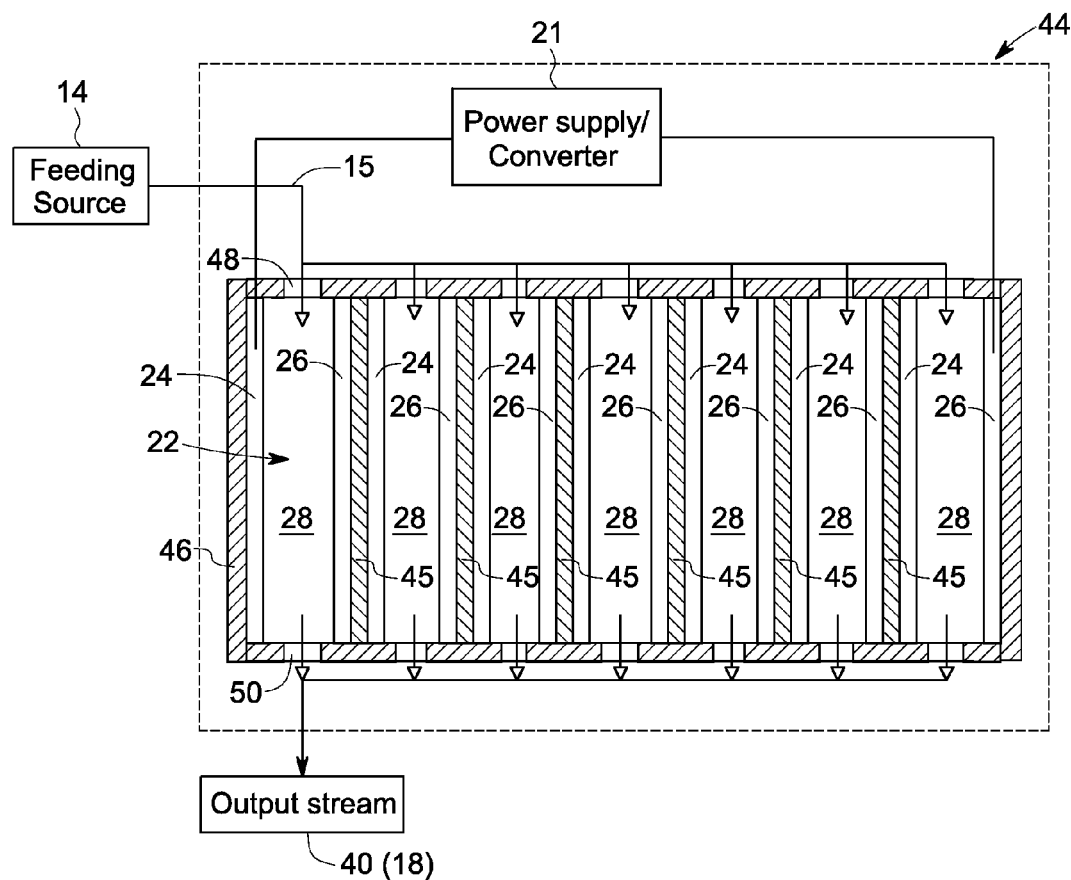
FIG. 4 is a cross-sectional view of an SCD device of the solid electrolyte producing system according to another embodiment of the invention.

Referring to FIG. 4, an SCD device 44 according to another embodiment of the invention comprises a plurality of SCD units 22 housed in a desalination vessel 46. Each SCD units 22 comprises a pair of electrodes 24, 26 and a compartment 28 between the pair of electrodes 24, 26. The SCD units 22 are arranged in parallel and are insulated from one another by an ion-impermeable film 45. Suitable ion-impermeable film 30 may include electrically conductive materials. Suitable electrically conductive materials may include an olefin-based polymer filled with conductive additive. Suitable olefin-based polymer can include polyethylene and polypropylene, which can be halogenated. Suitable conductive additive may include graphite powder, carbon black powder and active carbon. In the illustrated embodiment, the desalination vessel 46 includes a plurality of inlets 48 for simultaneously introducing feed liquid 15 respectively into corresponding compartment 28 in parallel, and a plurality of outlets 50 for exiting of output liquid which is a dilute liquid 40 at the charging mode of operation and a concentrated liquid 18 at a discharging mode of operation. In an alternative embodiment, which is not shown in the drawings, only one of the inlets 48 introduces a feed liquid 15 to one of the compartments 28, and the compartments 28 are interconnected in a manner that the outlet 52 of one compartment 28 communicates the inlet 50 of another compartment 28 in series, so that the liquid passes over each compartment 28. Only one of the outlets 52 is an exit of the output liquid. Accordingly, the concentrated liquid 18 can have a higher concentration of electrolyte. In another embodiment, the SCD device 44 can be configured in a combination way of the above described parallel and series modes.

In some embodiments, the precipitation of the electrolytes may not occur until the degree of saturation or supersaturation thereof is very high. For example, $CaSO_4$ reaches a saturation rate of 500% under room temperature before its precipitation occurs in a clear solution. Accordingly, in certain examples, seed particles (not shown) may be added into the crystallization device 16 of FIG. 1 to induce the precipitation on surfaces of the seed particles at a lower degree of saturation or supersaturation of the electrolyte. For example, precipitation of $CaSO_4$ may happen at a saturation rate as low as 105% to 120% with the presence of enough seed particles.

In one embodiment, the seed particles are electrolyte particles of the determined type of electrolyte to be produced. In other embodiments, the seed particles can be other particles such as sand. In certain embodiments, particles may have an average diameter ranging from about 0.001 to about 1 millimeters.

In one embodiment, the feed liquid 15 from the feeding source 14 comprise mainly one determined type of electrolyte. In one example, the feed liquid 15 is a NaOH solution which is a product of chlor-alkali industry, and comprises dissolved $Na^+$ and $OH^-$. Concentration of dissolved NaOH is about 10 to 30 percent of all dissolved electrolytes in the feed liquid 15. Accordingly, the solid electrolyte precipitated in the crystallization device 16 comprises very pure NaOH particles, and the electrolyte product from the separation device 53 comprise very pure NaOH product.

In another embodiment, the feed liquid 15 from the feeding source 14 comprises at least two types of electrolytes. Accordingly, the solid electrolyte precipitated in the crystallization device 14 may comprise a mixture of electrolyte particles of the at least two types, and the electrolyte product from the separation device 53 may comprise a mixture of the two types of electrolytes.

Figure 5:
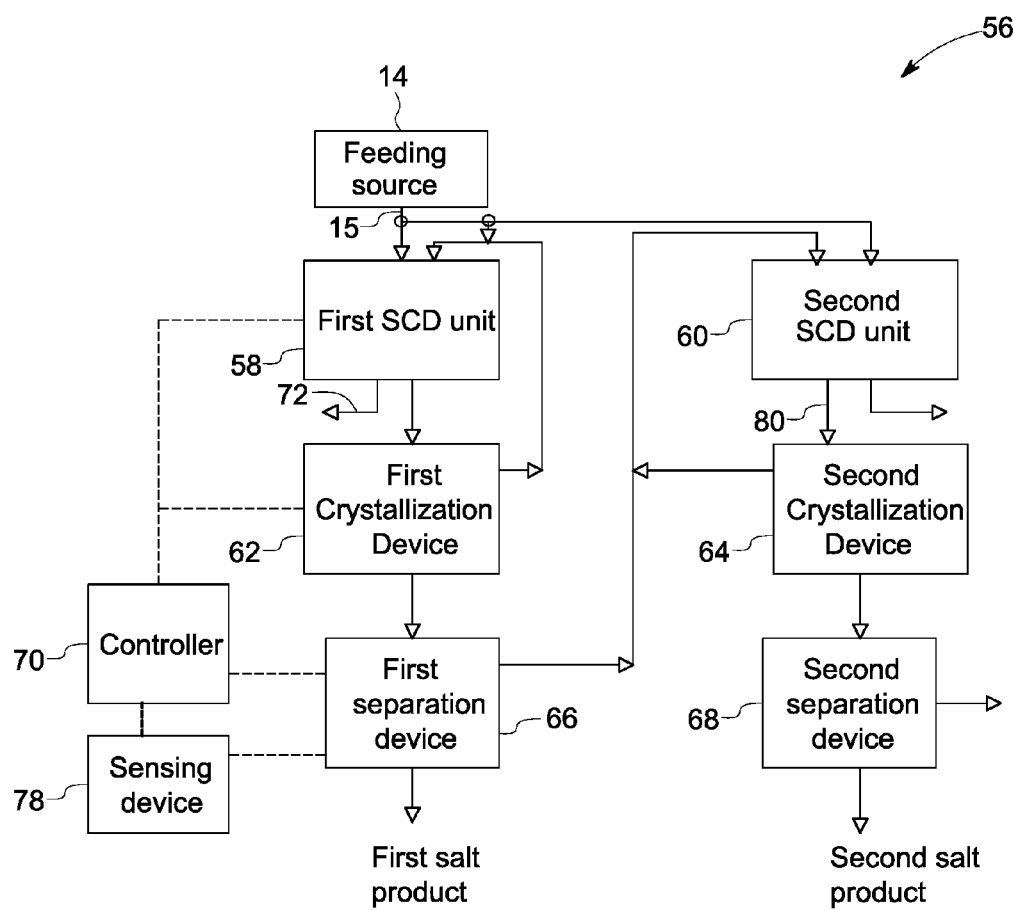
FIG. 5 is an exemplary block diagram of a solid electrolyte producing system according to another embodiment of the invention.

FIG. 5 illustrates a solid electrolyte producing system 56 according to another embodiment of the invention. The solid electrolyte producing system 56 comprises a first and a second SCD device 58, 60, a first and a second crystallization device 62, 64, a first and a second separation device 66, 68, and a controller 70. In certain embodiments, the feed liquid 15 provided by the feeding source 14 comprises at least two types of electrolytes ("first electrolyte" and "second electrolyte"). The feed liquid 15 passes the first SCD device 58. Dissolved cations and anions of the first and second electrolytes in the feed liquid 15 are adsorbed during charging mode of operation, and are desorbed during discharging mode of operations of the first SCD device 58. In certain embodiments, a dilute liquid 72 at the charging mode of operations may be again subjected to electrolyte producing by being fed back to the first SCD device 58 during charging mode of operations of the first SCD device 58, or be output for industrial use for example.

In the illustrated embodiment, the first crystallization device 62 receives a concentrated liquid 74 from the first SCD device 58. In certain embodiments, the controller 70 is configured to control concentrations of dissolved first and second electrolytes in first crystallization device 62 such that only one of the first and second electrolytes in the concentrated liquid 74 precipitates in the first crystallization device 62, while the other of the first and second electrolytes will not.

In one embodiment, the controller 70 comprises a sensing device 76 measuring concentrations of the first and second electrolytes in first crystallization device 62 at given temperature, and sends the concentration signals 78 to the controller 70. In one embodiment the concentrations of the electrolytes are measured under room temperature ranges from 15 to 25 degrees centigrade (° C.). Embodiments of the sensing device 76 may comprise ion selective electrodes, conductivity electrodes, or periodically off-line measurement devices. The controller 70 calculates saturation rate (R) of the first and second electrolytes using the concentration signal 78 according to equation 1 below, respectively:

$$R = C/C_s \qquad \text{Equation 1}$$

wherein "C" is the concentration of an electrolyte in the first crystallization device 62, and $C_s$ is the solubility of the electrolyte. A higher saturation rate (R) usually means that the electrolyte is easier to precipitate. The controller 70 is configured to control operation of the first SCD device 58 such that the saturation rate of one electrolyte is high enough and the electrolyte precipitates in the first crystallization device 62, while the saturation rate of the other electrolyte is not high enough and a precipitation of that electrolyte will not occur in the first crystallization device 62.

The solubilities of the first and second electrolytes under a given temperature are substantially constant, the saturation rates are accordingly only related to the concentrations of the dissolved electrolytes in the first crystallization device 62. Further, since the content of the two electrolytes in the feed liquid is determined, ratio of the two electrolytes in the concentrated liquid 74 is substantially constant. Accordingly, the controller 70 is configured to control a total electrolyte concentration in the concentrated liquid 74 of the first SCD device 58 such that one of the first and second electrolytes with a higher saturation rate is high enough for precipitation, and the other of the first and second electrolytes having a lower saturation rate is smaller and will not precipitate in the first SCD device 58. Accordingly, the electrolyte precipitated in the first crystallization device is a very pure electrolyte and is further separated from the liquid by the first separation device 66 as a first electrolyte product.

In an example, cations and anions in the feed liquid 15 comprises $Ca^{++}$, $SO_4^-$, $Na^+$, and $Cl^-$. Accordingly four types of electrolytes might precipitate from a concentrated liquid 74 in the first crystallization device 62, including calcium sulphate ("$CaSO_4$"), sodium chloride ("NaCl"), calcium chloride ("$CaCl_2$"), and sodium sulphate ($NaSO_4$). Solubilities of the four electrolytes under a temperature at 20° C. are as in Table 1 below:

TABLE 1

| Electrolyte | Solubility (gram/100 milliliter) |
|---|---|
| $CaSO_4$ | 0.24 |
| NaCl | 35.9 |
| $CaCl_2$ | 74.5 |
| $Na_2SO_4$ | 19.5 |

In one embodiment, concentration of each dissolved electrolyte in the first crystallization device 62 is measured and sent to the controller 70. The controller 70 is configured to calculate saturation rate (R) according to Equation 1 using the measured concentration and the solubilities in Table 1, and further controls operation of the first SCD device 58 such that the electrolyte with the largest saturation rate (R) precipitates, and saturation rates of other types of electrolytes are not high enough and precipitation of the other electrolyte types do not occur.

As is compared in Table 1, solubility of $CaSO_4$ is much lower than other three types of electrolytes. In one example, the saturation rate of $CaSO_4$ in the concentrated liquid 74 is the largest, and the concentrated liquid 74 is a supersaturated water of $CaSO_4$ and the saturation rate (R) of $CaSO_4$ is larger than 1. In one embodiment, the controller 70 controls that saturation rates (R) of NaCl, $CaCl_2$, and $Na_2SO_4$ such that they are each smaller than 1. In one embodiment, the feed liquid 15 from the feeding source 14 is also controlled to flow to the first crystallization device 62 for balancing when saturation rates of any of the three types of electrolytes is near to 1.

In one embodiment, part of the feed liquid 15 is fed to a second SCD device 60 during the charging mode while the liquid from the first separation device 66 is fed to the second SCD device 60 during the discharging mode. By adsorbing and desorbing during charging and discharging mode of operations, an even more concentrated liquid 80 in the discharging mode of operation is received by the second crystallization device 64. The concentrated liquid 80 is a supersaturated liquid of the at least two types of electrolytes, and is precipitated as solid electrolyte which is a mixture of the at least two types of electrolytes. The solid electrolyte mixture is further separated from the liquid by the second separation device 68 as a second electrolyte product.

The embodiments described herein are examples of compositions, structures, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A solid electrolyte producing system comprising:
   first and second supercapacitor desalination devices each comprising at least one supercapacitor desalination unit, each supercapacitor desalination unit comprising a pair of electrodes electrically coupled to a power supply and operable in a charging mode of operation and a discharging mode of operation;
   a feeding source configured to provide a feed liquid to the first supercapacitor desalination unit when the first supercapacitor desalination unit is in the charging mode of operation, the feed liquid comprising at least two determined electrolytes;
   a first crystallization device configured to receive a concentrated liquid comprising the at least two determined electrolytes from the first supercapacitor desalination unit in the discharging mode of operation, and to precipitate a single one of the at least two determined electrolytes;
   a second crystallization device configured to receive a concentrated liquid from the second supercapacitor desalination unit in the discharging mode of operation, and to precipitate a mixture of the at least two determined electrolytes; and
   first and second separation devices configured to separate solid electrolytes from liquids from the respective first and second crystallization devices as solid electrolyte products;
   wherein the second supercapacitor desalination unit is configured to receive the liquid from the first separation device for introduction into the second crystallization device for precipitating the mixture of the at least two determined electrolytes, and wherein the precipitate of the at least two determined electrolytes are based on saturated or supersaturated concentrations thereof, produced by circulation of the at least two determined electrolytes through the respective first and second supercapacitor desalination units in the discharging mode of operation.

2. The system of claim 1, wherein each of the pair of electrodes comprises a porous conductive portion and a current collector attached to the porous conductive portion.

3. The system of claim 2, wherein the porous conductive portion has a Brunauer-Emmet-Teller (BET) surface area in a range of from about 2.0 to about $5.5 \times 10^6$ ft$^2$lb$^{-1}$.

4. The system of claim 3, wherein the porous conductive portion comprises carbon, carbon nanotubes, graphite, carbon fiber, carbon cloth, carbon aerogel, metallic powders, conductive polymers, or any mixture thereof.

5. The system of claim 1, wherein each supercapacitor desalination unit comprises a flow spacer between the pair of electrodes.

6. The system of claim 1, wherein each of the first and second supercapacitor desalination device comprise a plurality of supercapacitor desalination units.

7. The system of claim 1 further comprising a plurality of seed particles disposed within the first and second crystallization devices to induce precipitation.

8. The system of claim 1, wherein the system further comprises a controller configured to control that the concentrated liquid in the first crystallization device is saturated or supersaturated water of one of the at least two types of electrolytes, and is under-saturated water with the other of the at least two types of electrolytes, and wherein the electrolytes saturated or supersaturated in water precipitate in the first crystallization device.

9. The system of claim 8, wherein the controller is configured to calculate a saturation rate of each of the at least two types of dissolved electrolytes in the concentrated liquid, and control the saturation rate of one of the at least two types of electrolytes to be higher than or equal to 1, and control the saturation rate of the other of the at least two types of electrolytes to be less than 1.

10. The system of claim 9, wherein the feed liquid is also controlled to flow to the first crystallization device for balancing when the saturation rate of the other of the at least two types of electrolytes is near to 1.

11. The system of claim 1, wherein each of the first and second separation devices comprise a settling tank, a filter press, a microfilter, an ultrafilter, a hydrocyclone, or a centrifuge.

12. A method for producing solid electrolyte comprising:
    adsorbing ions of at least two dissolved electrolytes from a feed liquid using first and second supercapacitor desalination units during a charging step;
    desorbing the ions from the first and second supercapacitor desalination units into respective concentrated liquids during a discharge step;
    passing the concentrated liquid comprising at least two dissolved electrolytes from the first supercapacitor desalination unit into a first crystallization device for precipitating a single one of the at least two dissolved electrolytes;
    passing the concentrated liquid from the second supercapacitor desalination unit into a second crystallization device for precipitating the other a mixture of the at least two dissolved electrolytes; and
    separating, by first and second separation device, solid electrolytes from the respective concentrated liquids as electrolyte products;
    wherein the second supercapacitor desalination unit is configured to receive the concentrated liquid from the first crystallization device first separation device for introduction into the second crystallization device for precipitating the mixture of the at least two dissolved electrolytes, and wherein the precipitate of the at least two determined electrolytes are based on saturated or supersaturated concentrations thereof, produced by circulation of the at least two determined electrolytes through the respective first and second supercapacitor desalination units in the discharging mode of operation.

13. The method of claim 12, further comprising controlling the concentrated liquid in the first crystallization device to be saturated or supersaturated with one of the at least two types of electrolytes, and to be under-saturated with the other of the at least two types of electrolytes.

14. The method of claim 13, wherein controlling comprises measuring concentrations of the at least two types of electrolytes in the concentrated liquid and calculating the concentration rate of each of the at least two types of electrolytes, and controlling the saturation rate of one of the two types of electrolytes to be equal to or larger than 1, and controlling the saturation rate of the other of the two types of electrolytes to be lower than 1.

* * * * *